US011915201B2

(12) United States Patent
Kennedy et al.

(10) Patent No.: US 11,915,201 B2
(45) Date of Patent: Feb. 27, 2024

(54) LOCATION-BASED CONFERENCE ROOM RECOMMENDATION

(71) Applicant: Zoom Video Communications, Inc., San Jose, CA (US)

(72) Inventors: John Carl Kennedy, Los Olivos, CA (US); Shane Paul Springer, Manchester, MI (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/724,042

(22) Filed: Apr. 19, 2022

(65) Prior Publication Data

US 2023/0334430 A1 Oct. 19, 2023

(51) Int. Cl.
*G06Q 10/10* (2023.01)
*G06Q 10/02* (2012.01)
*G06Q 10/1093* (2023.01)

(52) U.S. Cl.
CPC ......... *G06Q 10/1093* (2013.01); *G06Q 10/02* (2013.01)

(58) Field of Classification Search
CPC .......... G06Q 50/30; G06Q 30/04; G06K 9/18; G06K 7/10722; G06K 7/1417; G01C 21/3423; G01C 21/3484
USPC .......................................................... 705/5
See application file for complete search history.

(56) References Cited

U.S. PATENT DOCUMENTS

| | | | |
|---|---|---|---|
| 10,529,004 B2 | 1/2020 | Caralis et al. | |
| 10,579,694 B1 | 3/2020 | Jenkins et al. | |
| 11,323,493 B1* | 5/2022 | Xi | H04L 65/403 |
| 2011/0161487 A1* | 6/2011 | O'Sullivan | H04L 41/5067 709/227 |
| 2012/0185291 A1* | 7/2012 | Ramaswamy | G06Q 10/1095 705/7.19 |
| 2013/0314543 A1* | 11/2013 | Sutter | H04N 7/144 348/E7.085 |
| 2014/0236876 A1* | 8/2014 | Hapse | G06Q 10/101 709/204 |
| 2017/0372411 A1* | 12/2017 | Kolegraff | E05F 15/77 |
| 2018/0285820 A1* | 10/2018 | Vendrow | G06Q 10/109 |
| 2021/0264376 A1* | 8/2021 | Kilicoglu | G06F 40/279 |

(Continued)

OTHER PUBLICATIONS

Reinders, Michael; "Deep Dive: Understanding How Outlook Room Finder Uses the Places Service"; https://petri.com/deep-dive-understanding-how-outlook-room-finder-uses-the-places-service/; Mar. 28, 2022. (Year: 2022).*

*Primary Examiner* — Dione N. Simpson

(74) *Attorney, Agent, or Firm* — Young Basile Hanlon & MacFarlane, P.C.

(57) ABSTRACT

A server determines, during a conference implemented using conferencing software and based on stored data associated with two or more users participating in the conference, that the two or more users are accessing the conferencing software from separate user devices located in separate areas of an office premises. The server determines, by accessing stored conference room scheduling data of the office premises, that a conference room within the office premises is available for use by the two or more users. The server transmits, to each of the separate user devices, a prompt recommending that the two or more users further participate in the conference using a shared device configured to access the conferencing software within the conference room.

20 Claims, 8 Drawing Sheets

(56) References Cited

U.S. PATENT DOCUMENTS

2021/0357878 A1\* 11/2021 Suzuki ............... G06Q 10/1095
2021/0357978 A1   11/2021 Weiss et al.

\* cited by examiner

LOCATION-BASED CONFERENCE ROOM RECOMMENDATION

FIELD

This disclosure relates to systems and methods for providing users with a geographic location-based conference room recommendation before or during a conference, such as those that may be used with software services implemented over a network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
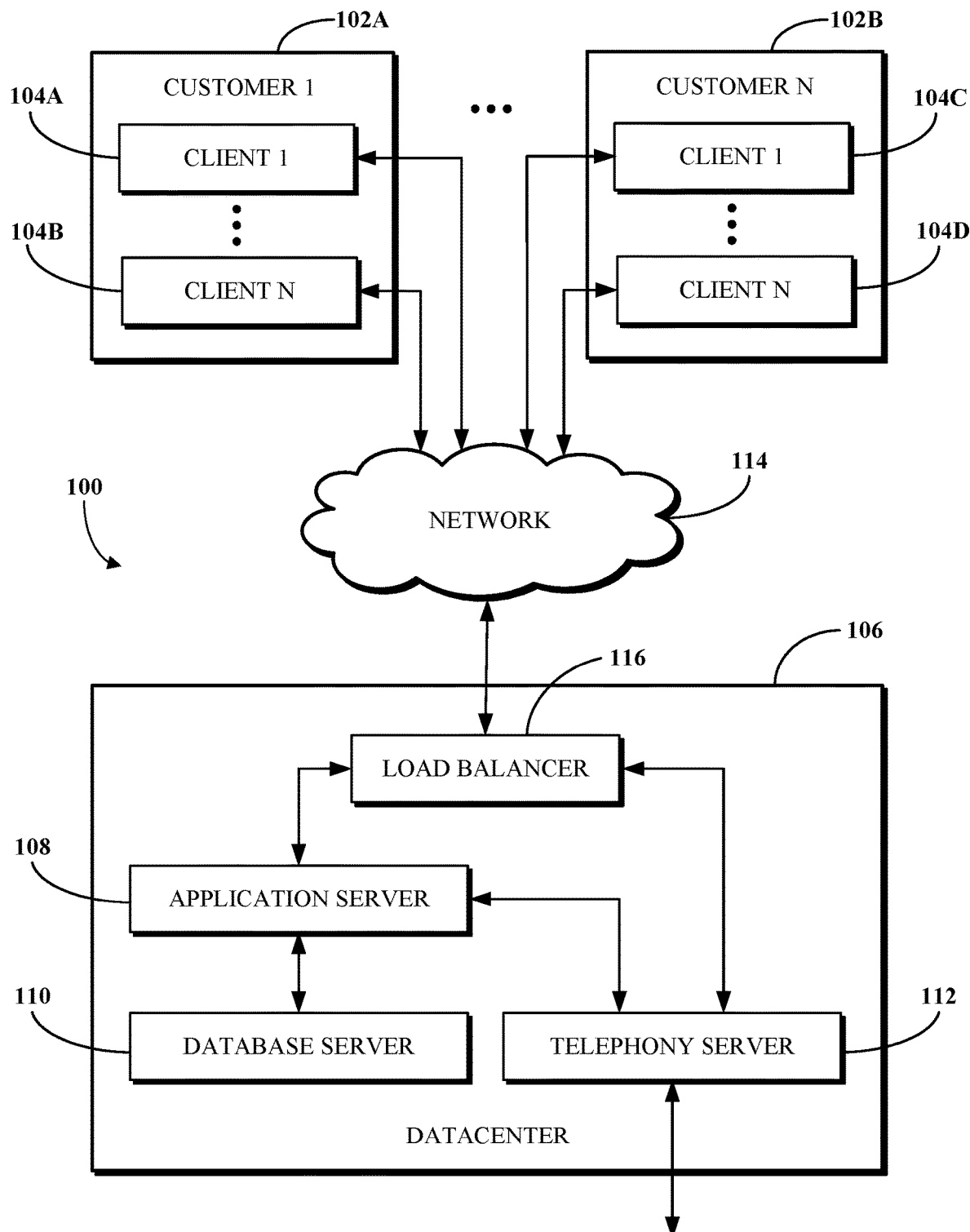
FIG. 1 is a block diagram of an example of an electronic computing and communications system.

In a hybrid work environment, some users of electronic devices (e.g., employees, contractors, volunteers, and/or other types of workers at a business) may come into an office a few days every week and work from home on other days. Other users may permanently work from home or permanently work in the office. To communicate with one another without first identifying the locations of the other parties, the users may schedule or initiate online conferences. Sometimes, users may initiate online conferences with other users who are located close to themselves, even though there are other ways of communicating (e.g., meeting in person in a conference room) which may have advantages over online conferencing. Online conferencing may result in users who are proximate to one another (e.g., a few desks or cubicles apart) communicating with one another via online conference and disturbing other people who are sitting nearby, while themselves suffering from background noise (e.g., due to other conferences or conversations). To alleviate such problems, businesses have invested in conference rooms that provide quiet spaces for high-quality audio and video conferencing. However, the reservation process for these conference rooms may be cumbersome and may be impractical for ad hoc conferences. As set forth above, encouraging users to use conference rooms, particularly when two or more users who are participating in a conference are both in the office, may be desirable.

Implementations of this disclosure address problems such as these by providing location-based conference room recommendations. A conferencing server (e.g., a server on a network or a local server, in an office premises, that supports conferencing technology) may communicate with user devices to allow user devices to access a conference. The conferencing server determines, during a conference and based on stored data associated with two or more users participating in the conference, that the two or more users are accessing the conferencing software from separate user devices located in separate areas of an office premises. For example, some or all of the two or more users may be accessing the conference from laptops connected (e.g., via docking systems) to hot desks (e.g., reserved or occupied desks, which include docking stations that communicate the identity of the user using the desk (e.g., identified via a reservation system or via a computing device connected to the docking system) to a server) within the office premises. In another example, some or all of the two or more users may be accessing the conference via a Wi-Fi® or other network associated with the office premises. The conferencing server determines, by accessing stored conference room scheduling data of the office premises, that a given conference room within the office premises is available for use by the two or more users. For example, the conferencing server may access the stored conference room scheduling data (which may include a table or other data structure indicating conference rooms in the office premises and times when the conference rooms are available or reserved) and determine that the given conference room is not reserved for a predicted duration of the conference (e.g., one hour or a length of time for the conference indicated in a calendar invite). The conferencing server transmits, to each of the separate user devices, a prompt recommending that the two or more users further participate in the conference using a shared device configured to access the conferencing software within the conference room. The shared device may be a conference room device which includes a large monitor, a video camera, a microphone, processing circuitry, and a memory. If at least two users respond to the prompt by accepting the invitation, the conference room may be reserved for the accepting users. If only a single user accepts the invitation, the single user may be notified that the conference room is not to be reserved because only a single user accepted it. Alternatively, in some cases, the conference room may be reserved for the single user so that the single user can limit the distraction they cause for people sitting next to them and/or reduce the background noise to which they are exposed.

Alternatively, the conferencing server may determine, before a conference is implemented and based on stored data associated with two or more users participating in the conference, that the two or more users are planning to access the conference from separate devices located in separate areas of an office premises. The data associated with the two or more users may include calendar data or data generated using artificial intelligence or statistical techniques. The calendar data may indicate on which days the users are likely to be in the office (e.g., if the user indicates, in their calendar, that they plan to come into the office). Alternatively, if a user comes into the office every Wednesday and he/she has a conference on a Wednesday, the conferencing server may determine that the user is likely to be in the office during the conference. The conferencing server determines, by accessing stored conference room scheduling data of the office premises, that a conference room within the office premises is scheduled to be available for use by the two or more users at a time of the conference. The server transmits, to the user devices of the two or more users, a prompt recommending that the two or more users participate in the conference from the conference room. If at least one or two users accepts the prompt, the conference room may be automatically reserved for the users who accepted.

To describe some implementations in greater detail, reference is first made to examples of hardware and software structures used to implement location-based conference room recommendation. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a Unified Communications as a Service (UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
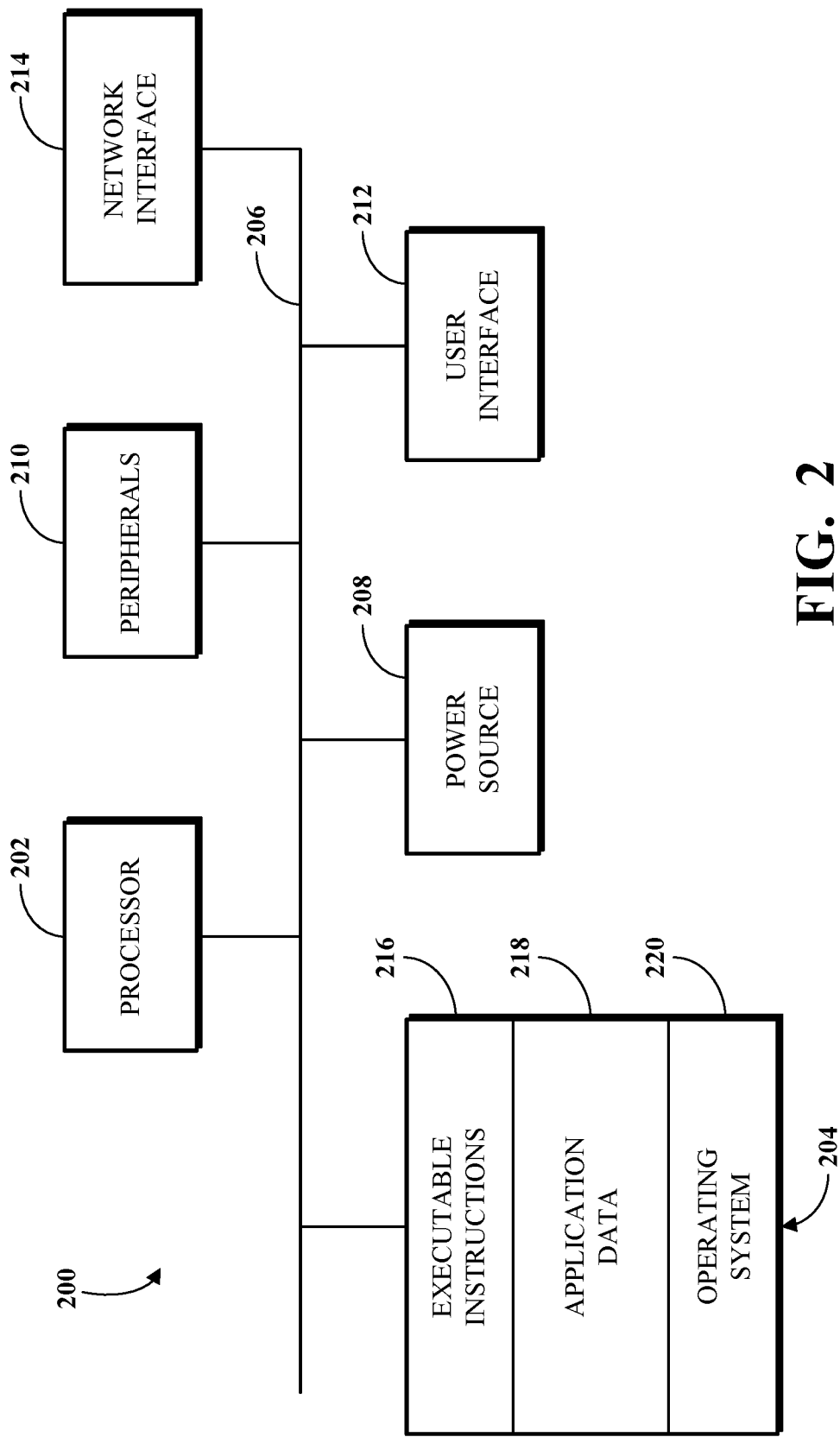
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
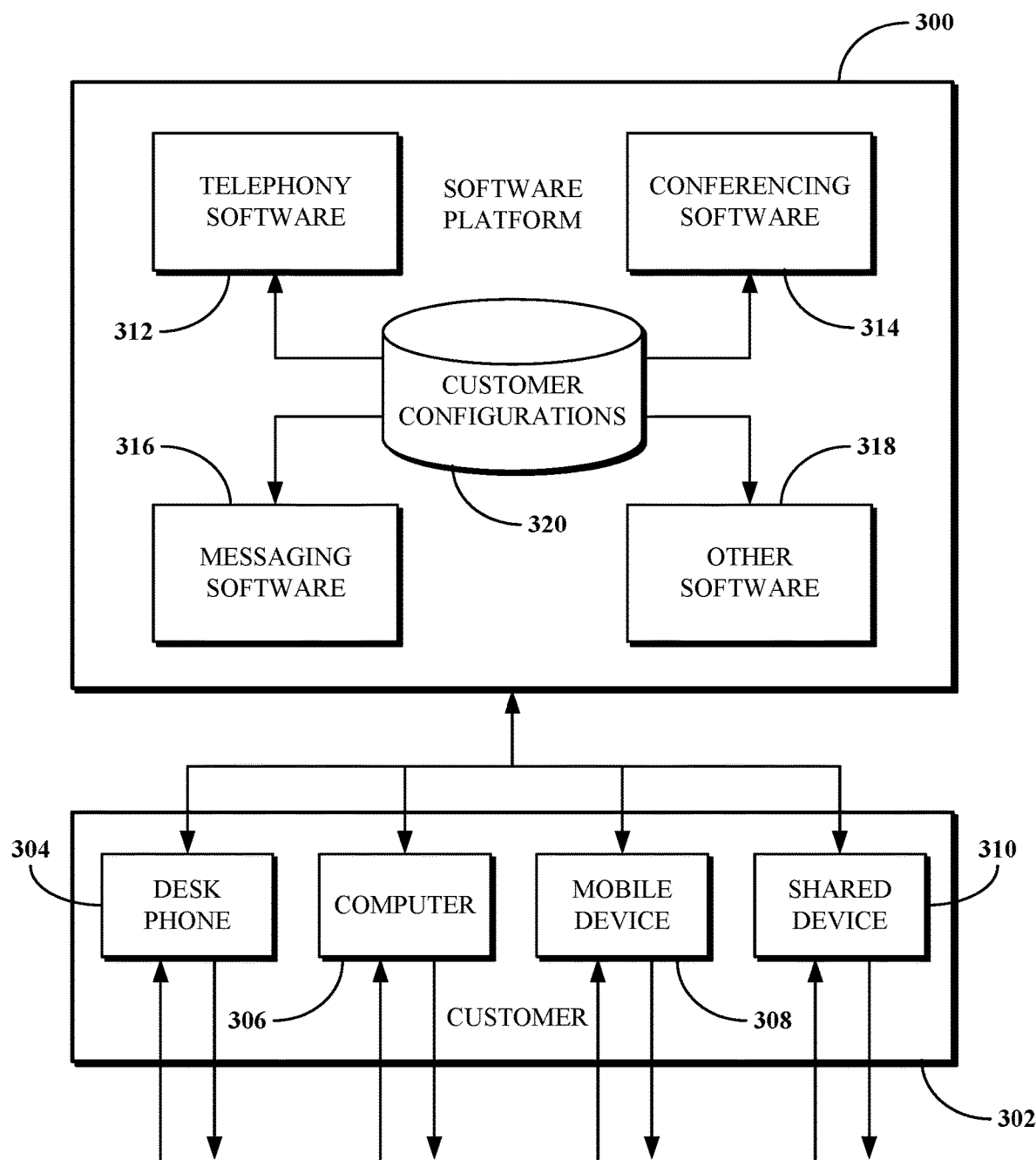
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include location-based conference room recommendation software.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
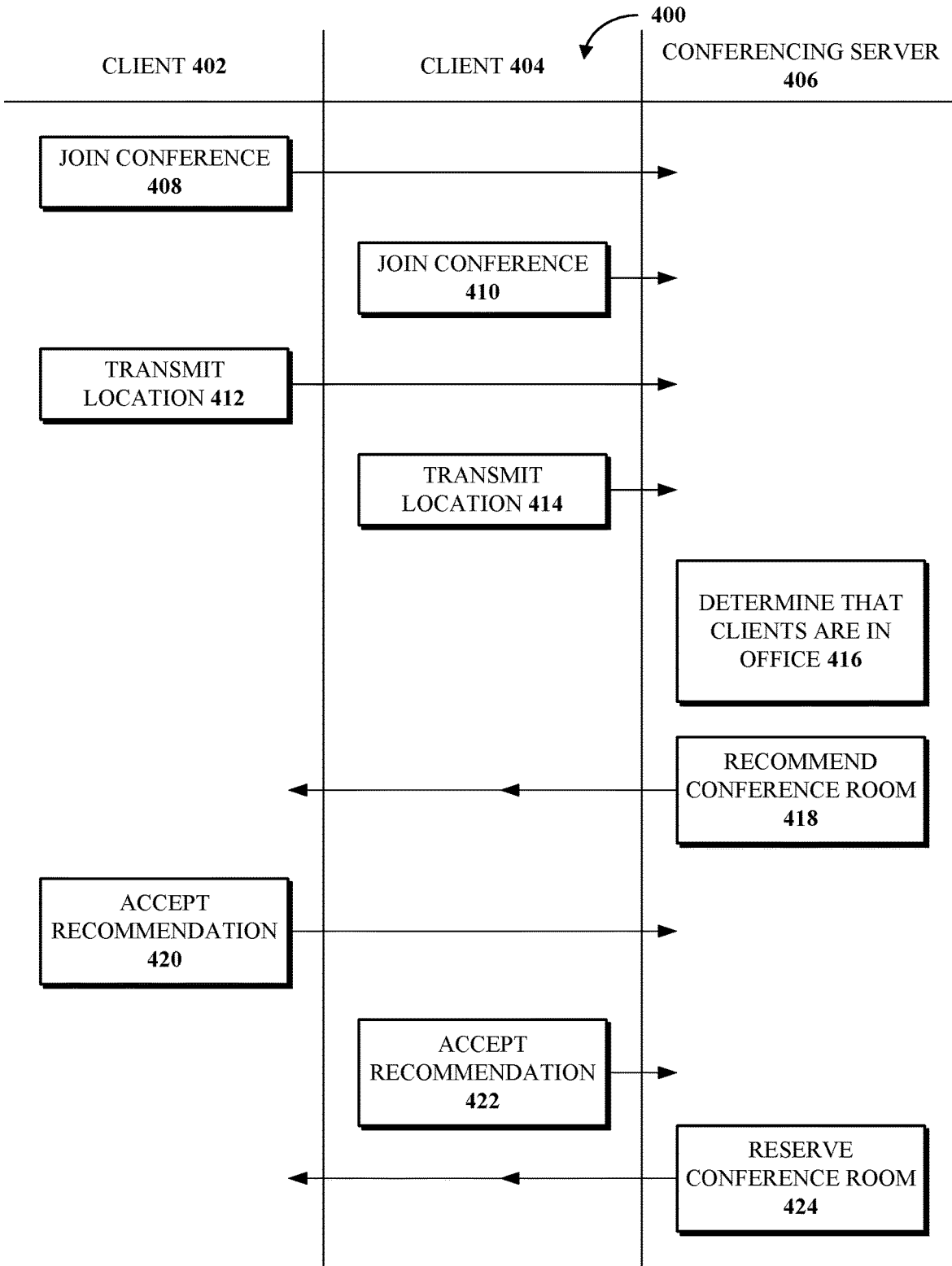
FIG. 4 is a data flow diagram of an example of location-based conference room recommendation for an ongoing conference.

FIG. 4 is a data flow diagram of an example of location-based conference room recommendation for an ongoing conference 400. As shown, the location-based conference room recommendation for the ongoing conference 400 is implemented using clients 402 and 404 and a conferencing server 406. Each of the clients 402 and 404 may correspond to one of the clients 104A-104D or the clients 304-310, to the extent different. The conferencing server 406 may, for example, correspond to the application server 108.

At block 408, the client 402 joins a conference via the conferencing server 406. For example, the client 402 may use conferencing software to access a conference (e.g., by entering identifying information of the conference or selecting a link to join the conference, where the link indicates the identifying information). At block 410, the client 404 joins the conference via the conferencing server 406 using similar techniques. The conferencing server 406 may be used to host the conference via the conferencing software. The conferencing software may allow the clients 402 and 404 to access a conference by communicating with the conferencing software.

At block 412, the client 402 transmits its location to the conferencing server 406. With appropriate user permissions, the client 402 may determine its location using global positioning system (GPS) technology, cell tower triangulation technology, or stored (e.g., in an external data repository) locations associated with Wi-Fi® routers from which a signal is detected at the client 402, and transmit the determined location to the conferencing server 406. Alternatively, if the client 402 is at a "hot desk" that is reserved for the client 402, the conferencing server 406 may have access to the hot desk reservation and, therefore, the location of the client 402. (If a user of the client 402 reserves a hot desk, the conferencing server 406 may assume that the user of the client 402 is in the office during the time of the reservation. The conferencing server 406 may also have access to information when the client 402 has checked in to a hot desk.) At block 414, the client 404 transmits its location to the conferencing server 406 using similar techniques.

A conference may include an audio conference and/or a video conference. In addition, some conferences may leverage text-based chat and/or file sharing technology. A conference may be implemented by multiple clients connecting to a conferencing server over a network for transmitting audio and/or video data or via the PSTN for audio data.

At block 416, the conferencing server determines, based on the transmitted locations of blocks 412 and 424, that the clients 402 and 404 are in the office. In response, at block 418, the conferencing server 406 recommends a conference room for the clients 402 and 404 to continue participating in the conference. The conference room that is recommended for the clients 402 and 404 may be selected using a data structure (e.g., as described below in conjunction with FIG. 6) that stores features and time availability of conference rooms in the office. For example, a conference room that is available for the duration of the conference (or one hour if no duration is specified in metadata associated with the conference) may be selected. In some cases, if metadata associated with the conference (e.g., generated in association with a calendar invite for the conference) indicates desirable features in a conference room (e.g., a whiteboard, a table, or soundproof walls for privacy), a conference room having the desirable features may be selected.

At block 420, the client 402 accepts the conference room recommendation. The conference room recommendation may be a message transmitted from the conferencing server 406 to the client device 402 and displayed at the client 402 within a window (or other part of the display unit) associated with the conference. Alternatively, the conference room recommendation may be transmitted using email, instant messaging, or any other communication technique to either the client 402 or to an address (e.g., an email address or an instant messaging address) associated with a user of the client 402. In some implementations, the conference room recommendation is transmitted via a pop-up or push notification from a client application associated with the conference. The displayed message may include buttons for accepting or rejecting the conference room recommendation. A user of the client 402 may select the appropriate button to accept the conference room recommendation. In response to the user of the client 402 selecting the appropriate button, a message may be transmitted, to the conferencing server 406, indicating that the user of the client 402 has accepted the conference room recommendation. At block 422, the client 404 accepts the conference room recommendation using similar techniques to those of the client 402 at block 420.

At block 424, in response to the clients 402 and 404 accepting the conference room recommendation, the conferencing server 406 reserves the conference room for the users of the clients 402 and 404. The conferencing server 406 may cause a shared device in the conference room to automatically (e.g., without additional human input) connect to the conference so that the users of the clients 402 and 404 may have an easy and seamless experience in connecting to the conference from the conference room. In some cases, the shared device may await some authentication (e.g., a login or a two-factor authentication code) from the user of the client 402 and/or the user of the client 404 before connecting to the conference. This may increase security of the conference. The shared device may be a computer (e.g., including processing circuitry and memory) that is connected with a microphone, an audio speaker, a video camera, and a display unit.

In one example use case, a first user device is operated by a user named Albert, a second user device is operated by a user named Betsy, and a third user device is operated by a user named Cindy. The user devices may correspond to the clients 402 or 404. Albert starts a conference and invites Betsy and Cindy to join. Betsy and Cindy join the conference. The conferencing server 406 determines the locations of the first user device, the second user device, and the third user device, and determines that the first user device of Albert is not within the office premises (or is in an unknown location, for example, because Albert did not agree to share his location with the conferencing server 406), but Betsy and Cindy are within the office premises. For example, Betsy may be working on her laptop at a hot desk within the office premises, while Cindy is on her mobile phone, with the mobile phone's location being identified as the office premises based on Wi-Fi routers that are accessible from a location of the mobile phone.

Upon determining that Betsy and Cindy are both in the office, the conferencing server 406 identifies a conference room that is available for use by Betsy and Cindy. As the conference was spontaneously started by Albert and was not previously scheduled (e.g., using an online calendar), the conferencing server 406 determines that the conference room is to be occupied by Betsy and Cindy for a predetermined time period (e.g., 30 minutes, 1 hour, or 2 hours) and only considers conference rooms that are available for that time period. The conferencing server 406 may recommend a conference room that has features which were used by Betsy or Cindy in past conferences. For example, if the conferencing server 406 has stored data indicating that Cindy likes to use a whiteboard during her conferences, the recommended conference room for use by Betsy and Cindy may include a whiteboard.

According to some implementations, the conferencing server 406 accesses a database (or other data repository) that stores a table (or other data structure) indicating conference rooms in the office premises, times when the conference rooms are available or occupied, and features of the conference rooms. Based on this table, the conferencing server 406 selects a conference room to recommend to Betsy and Cindy.

After receiving a message recommending the conference room, Betsy and Cindy may indicate their acceptance of the conference room. In response, Betsy and Cindy may be notified, by the conferencing server 406, that the conference room is being reserved for them, and Albert may be notified that Betsy and Cindy are walking to the conference room (and, thus, might leave the conference or not pay attention for a few minutes). The conferencing server 406 may transmit, to a shared device in the conference room, a control signal causing the shared device to connect to the conference of Albert, Betsy, and Cindy (e.g., to transmit and/or receive audio and video data with the conference and/or to transmit and/or receive files or screenshared data with the conference). As a result, when Betsy and Cindy arrive at the conference room, they might not need to reconnect to the conference and could seamlessly continue their conversation with Albert.

Figure 5:
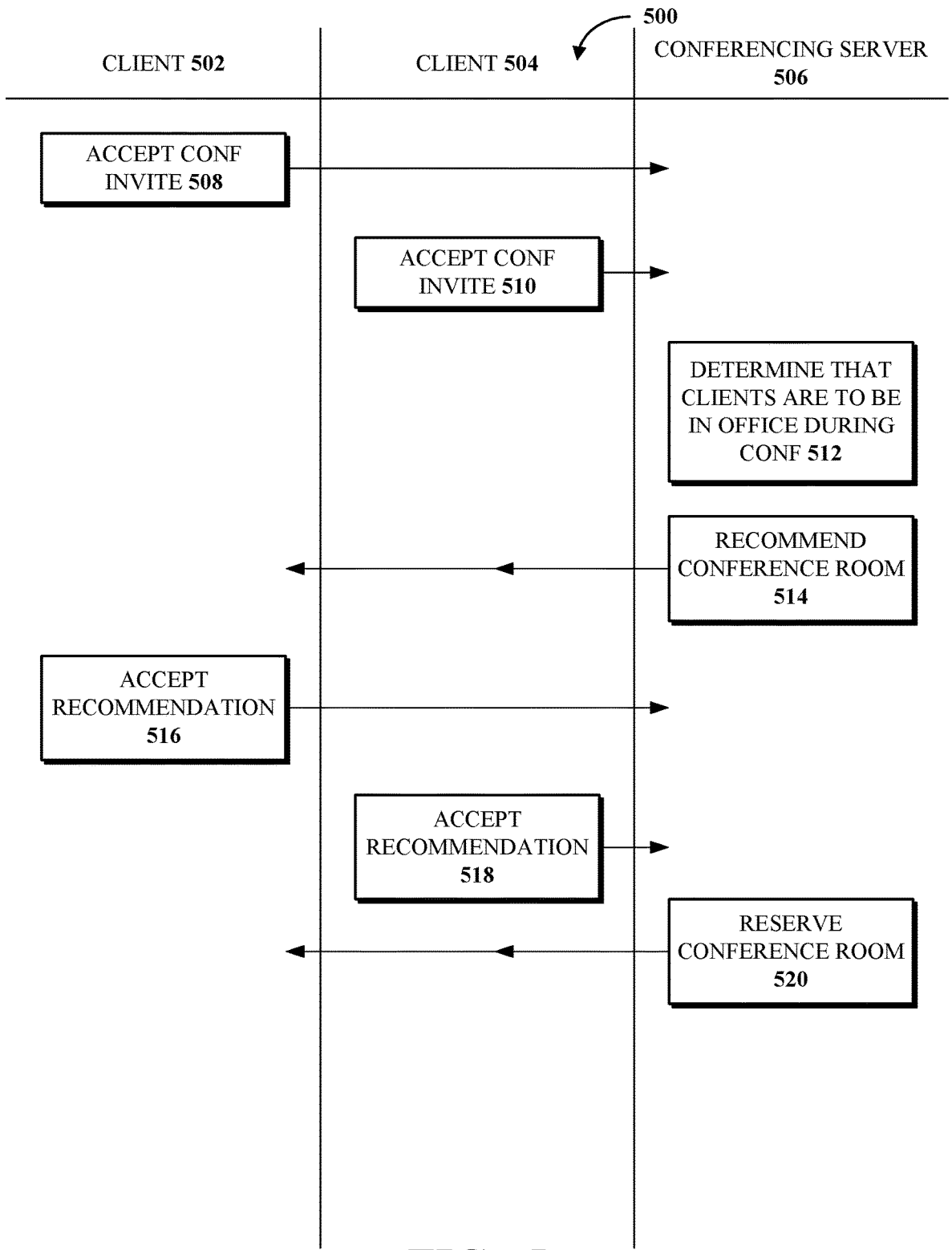
FIG. 5 is a data flow diagram of an example of location-based conference room recommendation for a future conference.

FIG. 5 is a data flow diagram of an example of location-based conference room recommendation for a future conference 500. As shown, the location-based conference room recommendation for the future conference 500 is implemented using clients 502 and 504 and a conferencing server 506. Each of the clients 502 and 504 may correspond to one of the clients 104A-104D or the clients 304-310, to the extent different. The conferencing server 506 may, for example, correspond to the application server 108. The conferencing server 506, similar to the conferencing server 406, may host a conference using conferencing software. The clients 502 and 504 may use the conferencing software to access a conference hosted by the conferencing server 506.

A user of the conferencing software (e.g., at the clients 502 or 504 or another client) may generate a calendar invite for the future conference and transmit the calendar invite to the clients 502 and 504. At block 508, the client 502 accepts the conference invite or otherwise indicates that a user of the client 502 plans to attend the conference (e.g., by accepting the conference invite from another device or by generating the conference invite) and notifies the conferencing server 506 of the acceptance. At block 510, the client 504 accepts the conference invite or otherwise indicates that a user of the client 504 plans to attend the conference and notifies the conferencing server 506 of the acceptance.

At block 512, the conferencing server 506 determines that the users of the clients 502 and 504 are expected to be in the office during a time of the conference. With appropriate permissions, the conferencing server 506 may make this determination based on at least one of: a location history of the client 502 or the client 504, an online calendar of the user of the client 502 or the user of the client 504, a work schedule of the user of the client 502 or the user of the client 504, or history of presence in the office of the user of the client 502 or the user of the client 504.

At block 514, upon determining that the users of the clients 502 and 504 are expected to be in the office during the conference, the conferencing server 502 recommends a conference room for the users of the clients 502 and 504. The recommendation of the conference room may be based on time availability of conference rooms in the office and/or features of the conference rooms, as discussed in conjunction with block 418 of FIG. 4.

At block 516, the client 502 accepts the recommendation. For example, the recommendation may be transmitted as a message within the conferencing software, a message within a client application associated with the conferencing software, an instant message, a chat message, or an email message. The user of the client 502 may select a link or a button within the message indicating that the user agrees to attend the conference from the conference room. It should be noted that the message may be transmitted to the client 502 or to another device or account (e.g., an email account or an instant messaging account) associated with the user of the client device 502. At block 518, the client 504 accepts the recommendation using similar techniques to the client 502 at block 516.

At block 518, in response to the users of the clients 516 and 518 indicating that they accept the recommendation to attend the conference via the conference room, the conference room is reserved, by the conferencing server 506, for the users of the clients 516 and 518. For example, the conferencing server 506 notifies the users of the clients 502 and 504 that the conference room is reserved and stores, in a data repository, an indication that the conference room is reserved for the users of the clients 502 and 504 at the time of the conference. In addition, a control signal may be sent, by the conferencing server 506, to a shared device in the conference room to cause the shared device to automatically connect to the conference at the time of the conference. In some cases, the shared device may await some authentication (e.g., a login or a two-factor authentication code) from the user of the client 502 and/or the user of the client 504 before connecting to the conference.

In one example use case, a first user device is operated by a user named Diana, a second user device is operated by a user named Emily, and a third user device is operated by a user named Frank. On Monday morning, Diana uses the first user device (which is connected to the conferencing server 506) to create a conference for Wednesday at 1:00 PM-1:30 PM Pacific Time. Diana titles the conference "secret discussion of upcoming litigation." Diana sends a calendar invite for the conference to Emily and Frank. Emily and Frank accept the calendar invite.

Diana's work schedule indicates that she works in the San Francisco office of ABC Corporation and comes into the office every day. Emily's work schedule indicates that Emily works from home on Mondays and Tuesdays but comes into the San Francisco office on Wednesdays, Thursdays, and Fridays. Frank is a remote employee based in New York City. However, according to Frank's work calendar, this week Frank has a flight from New York City to San Francisco on Tuesday morning and a flight back from San Francisco to New York City on Friday afternoon. Based on this information, the conferencing server 506 determines that Diana, Emily, and Frank, are all likely to be in the San Francisco office of ABC Corporation at the time of the conference on Wednesday. By consulting a database of conference rooms, the conferencing server 506 determines that three conference rooms—Conference Room A, Conference Room B, and Conference Room C—are available in the San Francisco office at the time of the conference. Conference Room A has no neighboring offices and soundproof walls. Conference Rooms B and C lack these features. As the conference includes the word "secret" in its title, the conferencing server 506 may determine (e.g., using natural language processing or other artificial intelligence techniques) that a soundproofed conference room is desirable. Thus, the conferencing server 506 may determine that Conference Room A is to be recommended for this conference.

The conferencing server 506 may transmit, to email addresses associated with Diana, Emily, and Frank, an email message asking each of Diana, Emily, and Frank whether they want to participate in the conference from Conference Room A. The email message may include links or buttons for accepting or declining to participate in the conference from Conference Room A. After receiving the email message, both Diana and Frank indicate that they accept participating in the conference from Conference Room A. Emily does not select any of the links or buttons in her email message.

Based on the acceptances of Diana and Frank, the conferencing server 506 reserves Conference Room A for Diana and Frank at the time of the conference. The conferencing server 506 transmits, to a shared device in Conference Room A, a control signal to automatically connect to the conference at 1:00 PM on Wednesday. The conferencing server 506 notifies Emily that Diana and Frank agreed to use Conference Room A to attend the conference.

On Wednesday afternoon, shortly before the conference, Emily indicates, via the email message, that she plans to attend the conference from Conference Room A. As all the participants of the conference plan to attend in person, the conferencing server 506 might determine that the shared device no longer needs to connect to the conference. (Alternatively, the shared device might still connect to the conference, for example, if additional attendees might join the conference remotely.) In the implementations where the shared device is not to automatically connect to the conference, the conferencing server transmits, to the shared device, a control signal to forego automatically connecting to the conference. As a result, the conference (which includes the word "secret" in the title) is able to take place without audio or video data being transmitted over the network. In the event that one of the participants in the conference does not show up at Conference Room A or additional remote participants are added to the conference, Diana, Emily or Frank may manually connect the shared device to the conference.

Figure 6:
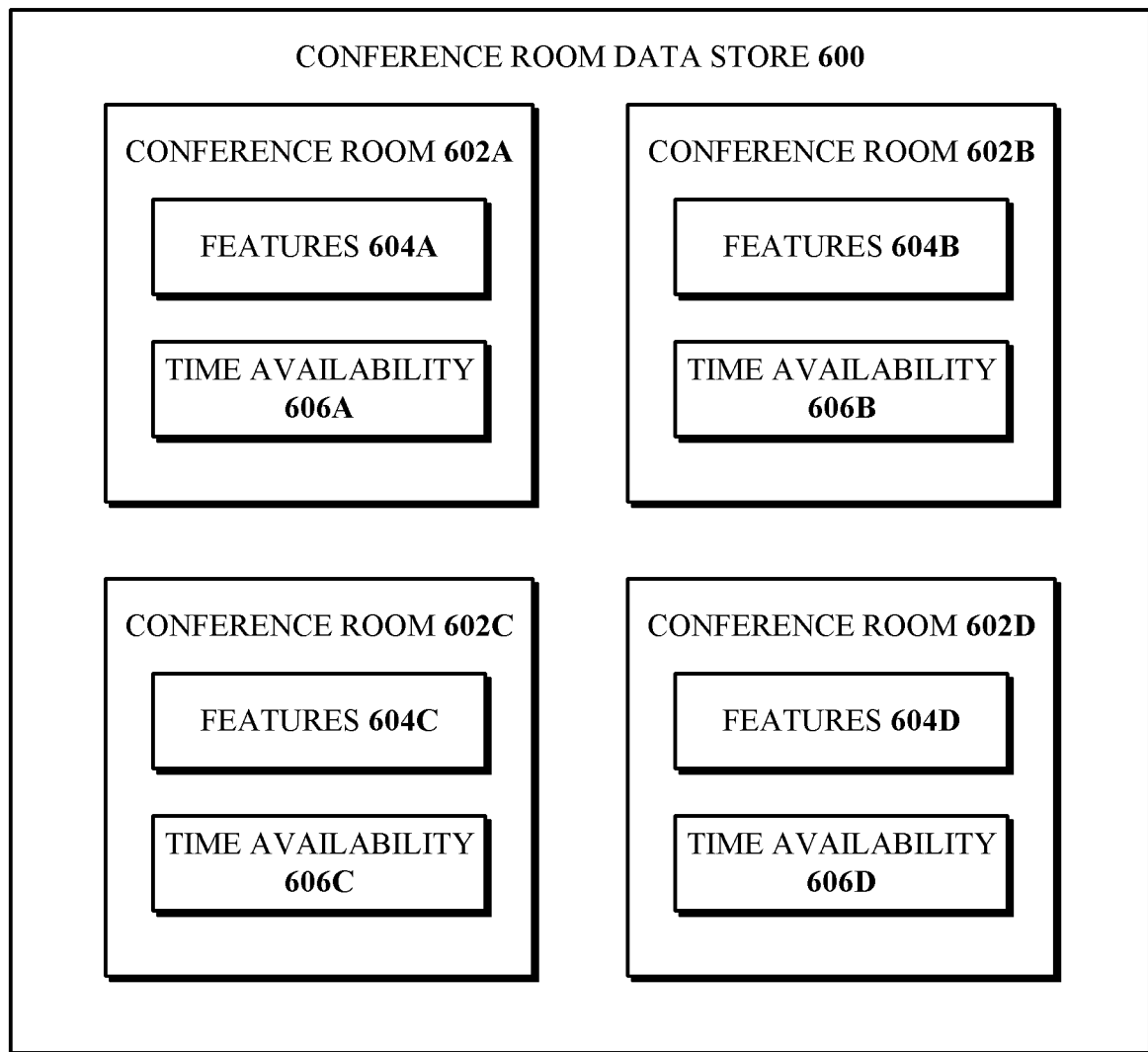
FIG. 6 is a block diagram of an example of a conference room data store.

FIG. 6 is a block diagram of an example of a conference room data store 600. The conference room data store 600 may be a data repository, for example, a database or any data storage unit including processing circuitry and a memory. Alternatively, the conference room data store 600 may be a data structure stored in the memory of the conferencing server 406, the conferencing server 506, and/or a machine accessible to the conferencing server 406 and/or the conferencing server 506.

As shown, the conference room data store 600 stores data structures related to four conference rooms 602A, 602B, 602C, 602D at a premises. In alternative implementations, the conference room data store 600 may store data about other numbers of conference rooms (e.g., tens or hundreds of conference rooms for each premises). The conference room data store 600 may be associated with a single premises or multiple premises. For example, if a law firm has offices in Austin, Dallas, and Houston, a single conference room data store may store data about conference rooms in all three offices or each office may be associated with its own conference room data store.

As shown, the data structure representing conference room 602A stores features 604A and time availability 606A of the associated conference room. The features 604A may include any features that are applicable for scheduling usage of conference rooms. For example, the features 604A may include at least one of: number of seats, number of tables, presence of sound proofed walls, presence of green screen, presence of coffee machine, or presence of water cooler. The time availability 606A indicates times when the associated conference room is available or reserved. When the conference room is reserved, the reservations may be made manually by a person wishing to use the conference room (e.g., by accessing a mobile application or a webpage) or automatically by the conferencing server 406, 506 using the techniques disclosed herein. Similarly, the data structure representing the conference room 602B includes features 604B and time availability 606B. The data structure representing the conference room 602C includes features 604C and time availability 606C. The data structure representing the conference room 602D includes features 604D and time availability 606D.

In one example use case, the conferencing server 506 accesses the conference room data store 600 to schedule a 9:00-10:00 AM conference in the Miami office of Accounting Firm X for three in-person participants, one of whom had a red-eye flight the night before. The Miami office has four conference rooms—represented as conference rooms 602A-602D. Based on the time availability 606A-606D, the conferencing server 506 determines that conference room 602A is reserved for 9:00-10:00 AM. However, conference rooms 602B, 602C, and 602D are available at 9-10 AM. Based on the data that one of the in-person participants in the conference had a red-eye flight, the conferencing server 602A determines (e.g., based on a stored set of rules or using artificial intelligence techniques) that having a coffee machine in the conference room that is reserved would be advantageous. Based on the features 604B, 604C, and 604D of the conference rooms 602B, 602C, and 602D, the conferencing server 506 determines that conference room 602B has a coffee machine, while conference rooms 602C and 602D lack a coffee machine. Accordingly, the 9: 00-10:00 AM conference is scheduled to occur in conference room 602B, and the time availability 606B of the conference room 602B is adjusted accordingly.

Figure 7:
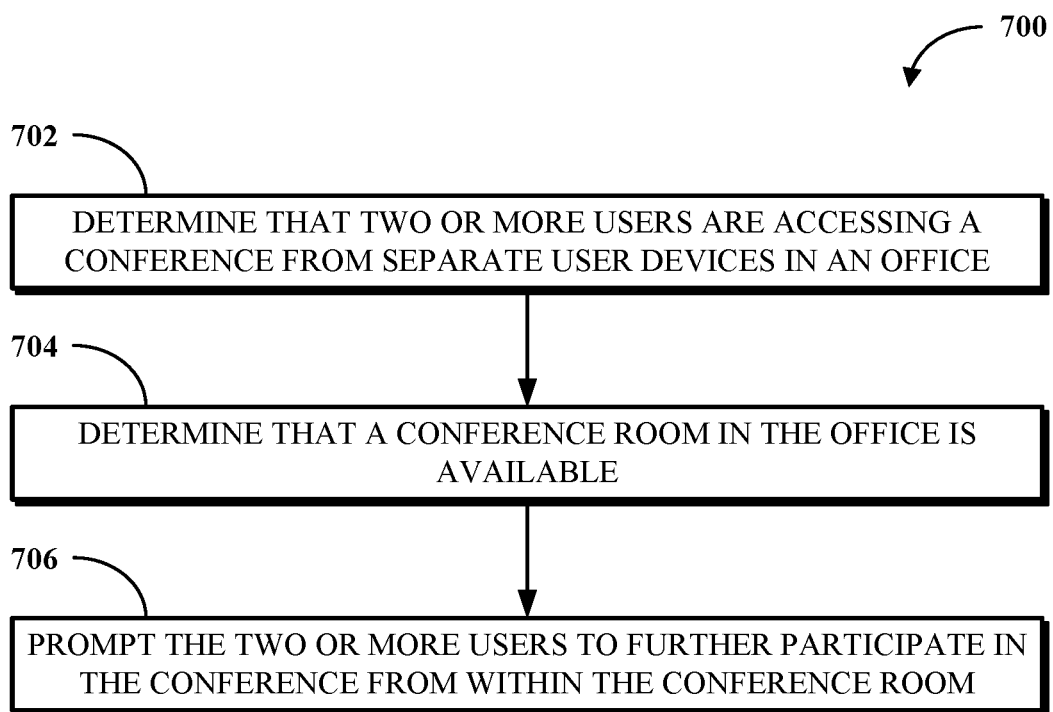
FIG. 7 is a flowchart of an example of a technique for location-based conference room recommendation for an ongoing conference.
Figure 8:
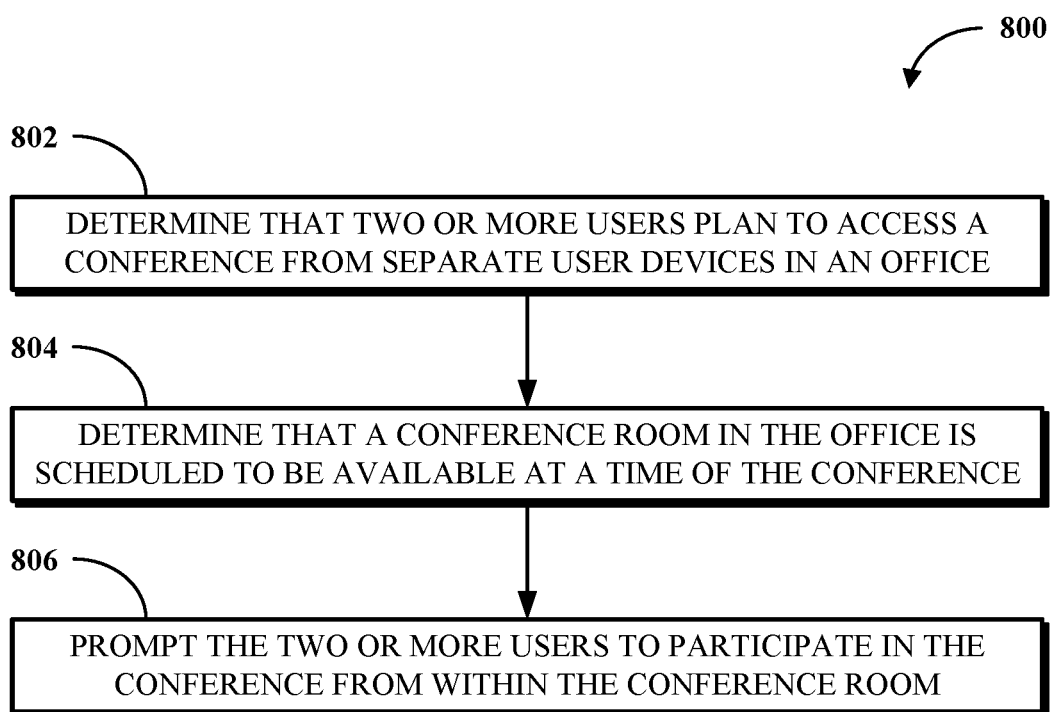
FIG. 8 is a flowchart of an example of a technique for location-based conference room recommendation for a future conference.

To further describe some implementations in greater detail, reference is next made to examples of techniques which may be performed by or using software for location-based conference room recommendation. FIG. 7 is a flowchart of an example of a technique 700 for location-based conference room recommendation for an ongoing conference. FIG. 8 is a flowchart of an example of a technique 800 for location-based conference room recommendation for a future conference. The techniques 700 and/or 800 can be executed using computing devices, such as the systems, hardware, and software described with respect to FIGS. 1-6. The techniques 700 and/or 800 can be performed, for example, by executing a machine-readable program or other computer-executable instructions, such as routines, instructions, programs, or other code. The steps, or operations, of the techniques 700 and/or 800 or another technique, method, process, or algorithm described in connection with the implementations disclosed herein can be implemented directly in hardware, firmware, software executed by hardware, circuitry, or a combination thereof.

For simplicity of explanation, the techniques 700 and 800 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, a flowchart of an example of the technique 700 for location-based conference room recommendation for an ongoing conference is shown. The technique 700 may, for example, be implemented using a conferencing server (e.g., the conferencing server 406 or another computing device including some or all of the components of the computing device 200).

At 702, the conferencing server determines, during a conference implemented using conferencing software (e.g., running at the conferencing server) and based on stored data associated with two or more users participating in the conference, that the two or more users are accessing the conference from separate user devices located in separate areas of an office premises. The determination that the two or more users are accessing the conference from separate user devices located in separate areas of an office premises may be made based on at least one of an occupied or reserved desk location (e.g., a hot desk) of at least one of the separate user devices, a network switch, network router, or network port to which the at least one of the separate user devices is connected, a geographic location of the at least one of the separate user devices identified at the at least one of the separate user devices (e.g., using GPS or cellular triangulation technology), or an audio signal detected at the at least one of the separate user devices. In the audio signal implementation, the same audio signal may be detected at two or more of the separate user devices. Alternatively, an audio signal may be played from a speaker of a first one of the separate user devices and detected at a microphone of a second one of the separate user devices to determine that the first one of the separate user devices and the second one of the second user devices are within an audible distance of one another.

At 704, the conferencing server determines, by accessing stored conference room scheduling data of the office premises, that a conference room within the office premises is available for use by the two or more users. The conference room may be selected, by the conferencing server, based on stored conference configuration data associated with the conference and/or associated with at least one of the users participating in the conference. For example, if the conference is labeled indicating that a whiteboard is to be used during the conference, a conference room with a white board may be selected. In another example, if one of the attendees of the conference uses a wheelchair, a wheelchair-accessible conference room may be selected. The labelling of the conference may be done manually by a user. Alternatively, the labeling may be determined based on text analysis (e.g., using a rule-based technique, a neural network, or another artificial intelligence technique) of the title of the conference and/or other content associated with the content (e.g., within a body or attachment of the conference invitation or a document or record associated with that invitation).

At 706, the conferencing server transmits, to each of the separate user devices, a prompt recommending that the two or more users further participate in the conference using a shared device configured to access the conferencing software within the conference room. In response to the prompt, the conferencing server may receive indicia that none, exactly one, or at least two users agree to further participate in the conference using the shared device in the conference room. If at least two users agree to further participate in the conference using the shared device, then the conferencing server reserves the conference room for those users. If none of the users agree to further participate in the conference using the shared device, then the conferencing server foregoes reserving the conference room.

If exactly one user agrees to further participate in the conference using the shared device, different courses of action are possible. According to some implementations, the conference room is reserved for the exactly one user so that the exactly one user may participate in the conference from a location where they are less likely to be disturbed by other people and less likely to disturb other people. According to some implementations, the exactly one user may be notified that the conference room is not being reserved due to lack of interest from the other users.

According to some implementations, the minimum number of participants that are to agree to use the conference room (in order for the conference room to be reserved) may be configured by a user organizing the conference or a host of the conference. According to some implementations, the user organizing the conference and/or the host of the conference may mandate that certain other users (e.g., other users who are in the office or other users who are subordinates of the organizer or host) attend the conference from the conference room.

According to some implementations, the conferencing server may store global awareness information regarding other conferences or other telephone calls that are occurring simultaneously with the conference. The recommendation to use the conference room may include some or all of the global awareness information about other conferences or other telephone calls that are occurring in the office (e.g., proximate to a location of the user within the office) to notify the user that they might be subject to background noise and/or causing interference for other users if they do not use the conference room.

According to some implementations, multiple conference rooms in multiple offices may be reserved for a given conference. For example, a conference may be scheduled for a company with employees attending from the San Francisco office and the Tokyo office. Two employees in San Francisco and 10 employees in Tokyo may indicate that they wish to attend the conference via conference rooms and the other employees may indicate that they wish to attend from their personal computing devices. A conference room may be reserved in the San Francisco office for the two employees and another conference room may be reserved in the Tokyo office for the 10 employees. In some cases, if no conference rooms large enough for 10 employees are available in the Tokyo office, two (or more) conference rooms may be reserved in the Tokyo office.

Referring next to FIG. 8, a flowchart of an example of the technique 800 for location-based conference room recommendation for a future conference is shown. The technique 800 may, for example, be implemented using a conferencing server (e.g., the conferencing server 506 or another computing device including some or all of the components of the computing device 200).

At 802, the conferencing server determines, before a conference is to be implemented using conferencing software and based on stored data associated with two or more users participating in the conference, that the two or more users are planning to access the conference from separate user devices located in separate areas of an office premises. The conference may be scheduled using the conferencing software before the conference is to be implemented. For example, the conferencing software may be used to create a calendar invite for the conference, and the calendar invite may be sent to prospective attendees. The conferencing server determining that the two or more users are planning to access the conferencing software from the separate user devices located in the separate areas of the office premises is based on at least one of: a calendar of at least one of the two or more users, or a current or past geographic location of a user device of the at least one of the two or more users. The calendar of a user may indicate that the user plans to be in the office on a given day (e.g., if the user has scheduled in-person activities that are located in the office). The current or past geographic location may be used to determine whether a user is traveling towards the office. For example, if a user is traveling on a subway line towards an office location, the geographic location of the user's device would move along the subway line in the direction of the office.

At 804, the conferencing server determines, by accessing stored conference room scheduling data of the office premises, that a conference room within the office premises is scheduled to be available for use by the two or more users at a time of the conference. In some implementations, the conferencing server identifies a conference room configuration using an artificial intelligence engine and based on data associated with past conferences of at least a subset of the two or more users. The conferencing server selects the conference room based on the conference room configuration. The engine may include software, hardware, or a combination of software and hardware.

At 806, the conferencing server transmits, to each of the separate user devices, a prompt recommending that the two or more users participate in the conference using a shared device configured to access the conferencing software within the conference room. If at least two users indicate acceptance of the prompt via their user devices, the conference room may be reserved for those users. If exactly one user indicates acceptance of the prompt via their user device, the conference room may or may not be reserved depending on settings configured by an administrator of the conferencing server or the conferencing software. If no users indicate acceptance of the prompt, the conference room is not reserved.

In some cases, the conferencing server identifies a change in plans of at least one user from the two or more users that causes that user to be unable to participate in the conference using the shared device. The conferencing serve may notify (e.g., in an email message or in a notification generated by the conferencing software) other user who are planning to attend the conference via the conference room of the change in plans. For example, a user who normally comes into the office on Tuesdays might indicate (e.g., in an email message or in a shared office calendar) that they will be working from home this Tuesday. As a result, the user might be unable to access a conference from a conference room, where the user previously indicated that they would access the conference from the conference room. In some cases, the selected (for a conference) conference room may be selected based on the number of users who plan to access the conference from the conference room. For example, if two users plan to access the conference from the conference room, a small (e.g., 4 meter by 4 meter) conference room may be acceptable. However, if 100 users plan to access the conference from the conference room, a larger auditorium-sized conference room (e.g., 10 meter by 10 meter) may be desirable.

Some implementations are described below as numbered examples (Example 1, 2, 3, etc.). These examples are provided as examples only and do not limit the other implementations disclosed herein.

Example 1 is a method, comprising: determining, during a conference implemented using conferencing software and based on stored data associated with two or more users participating in the conference, that the two or more users are accessing the conferencing software from separate user devices located in separate areas of an office premises; determining, by accessing stored conference room scheduling data of the office premises, that a conference room within the office premises is available for use by the two or more users; and transmitting, to each of the separate user devices, a prompt recommending that the two or more users further participate in the conference using a shared device configured to access the conferencing software within the conference room.

In Example 2, the subject matter of Example 1 includes, wherein determining that the two or more users are accessing the conferencing software from the separate user devices located in the separate areas of the office premises is based on at least one of: an occupied or reserved desk location of at least one of the separate user devices, a network switch, network router, or network port to which the at least one of the separate user devices is connected, a geographic location of the at least one of the separate user devices identified at the at least one of the separate user devices, or an audio signal detected at the at least one of the separate user devices.

In Example 3, the subject matter of Examples 1-2 includes, receiving, in response to the prompt, indicia that at least two of the two or more users agree to further participate in the conference using the shared device; and reserving the conference room for the at least two of the two or more users.

In Example 4, the subject matter of Examples 1-3 includes, receiving, in response to the prompt, indicia that only one of the two or more users agrees to further participate in the conference using the shared device; and notifying a user device of the only one of the two or more users that the conference room is not being reserved due to lack of interest from other users.

In Example 5, the subject matter of Examples 1-4 includes, identifying a conference room configuration based on stored conference configuration data associated with at least one of the two or more users participating in the conference; and selecting the conference room having the conference room configuration.

In Example 6, the subject matter of Examples 1-5 includes, identifying a conference room configuration based on stored conference configuration data associated with the conference; and selecting the conference room based on the conference room configuration.

In Example 7, the subject matter of Examples 1-6 includes, wherein determining that the two or more users are accessing the conferencing software from the separate user devices located in the separate areas of the office premises is based on an audio signal being played from a speaker of a first device of the separate user devices and detected at a microphone of a second device of the separate user devices.

Example 8 is a non-transitory computer readable medium storing instructions operable to cause one or more processors to perform operations comprising: determining, during a conference implemented using conferencing software and based on stored data associated with two or more users participating in the conference, that the two or more users are accessing the conferencing software from separate user devices located in separate areas of an office premises; determining, by accessing stored conference room scheduling data of the office premises, that a conference room within the office premises is available for use by the two or more users; and transmitting, to each of the separate user devices, a prompt recommending that the two or more users further participate in the conference using a shared device configured to access the conferencing software within the conference room.

In Example 9, the subject matter of Example 8 includes, storing instructions operable to cause the one or more processors to perform operations comprising: transmitting, to the shared device, a control signal causing the shared device to automatically access the conference without additional human input.

In Example 10, the subject matter of Examples 8-9 includes, wherein determining that the two or more users are accessing the conferencing software from the separate user devices located in the separate areas of the office premises is based on at least one of: an occupied desk location of at least one of the separate user devices, a network device to which the at least one of the separate user devices is connected, a geographic location of the at least one of the separate user devices identified at the at least one of the separate user devices, or an audio signal detected at a microphone of the at least one of the separate user devices.

In Example 11, the subject matter of Examples 8-10 includes, storing instructions operable to cause the one or more processors to perform operations comprising: receiving, in response to the prompt, information indicating that at least two of the two or more users agree to further participate in the conference using the shared device; and reserving the conference room for the at least two of the two or more users in response to the received information.

In Example 12, the subject matter of Examples 8-11 includes, storing instructions operable to cause the one or more processors to perform operations comprising: receiving, in response to the prompt, information indicating that only one of the two or more users agrees to further participate in the conference using the shared device; and notifying, in response to the received information, a user device of the only one of the two or more users that the conference room is not being reserved due to lack of interest from other users.

In Example 13, the subject matter of Examples 8-12 includes, storing instructions operable to cause the one or more processors to perform operations comprising: accessing stored conference configuration data associated with at least one of the two or more users participating in the conference; and selecting the conference room based on the stored conference configuration data.

In Example 14, the subject matter of Examples 8-13 includes, storing instructions operable to cause the one or more processors to perform operations comprising: identifying a conference room configuration based on configuration data associated with the conference; and selecting the conference room based on the conference room configuration.

In Example 15, the subject matter of Examples 8-14 includes, wherein determining that the two or more users are accessing the conferencing software from the separate user devices located in the separate areas of the office premises is based on audio output at a first device of the separate user devices and detected at a microphone of a second device of the separate user devices.

Example 16 is an apparatus, comprising: a memory; and a processor configured to execute instructions stored in the memory to: determine, during a conference implemented using conferencing software and based on stored data associated with two or more users participating in the conference, that the two or more users are accessing the conferencing software from separate user devices located in separate areas of an office premises; determine, by accessing stored conference room scheduling data of the office premises, that a conference room within the office premises is available for use by the two or more users; and transmit, to each of the separate user devices, a prompt recommending that the two or more users further participate in the conference using a shared device configured to access the conferencing software within the conference room.

In Example 17, the subject matter of Example 16 includes, wherein determining that the two or more users are accessing the conferencing software from the separate user devices located in the separate areas of the office premises is based on at least one of: a reserved desk location of at least one of the separate user devices, a network identifier of a wireless network to which the at least one of the separate user devices is connected, or a geographic location of the at least one of the separate user devices.

In Example 18, the subject matter of Examples 16-17 includes, wherein the processor is configured to execute the instructions stored in the memory to: receive a signal that at least one user agrees to further participate in the conference using the shared device; and reserve the conference room for the at least one user.

In Example 19, the subject matter of Examples 16-18 includes, wherein the processor is configured to execute the instructions stored in the memory to: receive, in response to the prompt, indicia that exactly a single user agrees to further participate in the conference using the shared device; and notify a user device of the single user that the conference room is not being reserved due to lack of interest from other users.

In Example 20, the subject matter of Examples 16-19 includes, wherein the processor is configured to execute the instructions stored in the memory to: identify a conference room configuration based on stored conference configuration data associated with at least one of the two or more users participating in the conference; and select the conference room having the conference room configuration.

Example 21 is a method, comprising: determining, before a conference is implemented using conferencing software and based on stored data associated with two or more users associated with the conferencing software, that the two or more users are planning to access the conference from separate user devices located in separate areas of an office premises; determining, by accessing stored conference room scheduling data of the office premises, that a conference room within the office premises is available for use by the two or more users at a time of the conference; and transmitting, to each of the separate user devices, a prompt recommending that the two or more users participate in the conference using a shared device configured to access the conferencing software within the conference room.

In Example 22, the subject matter of Example 21 includes, wherein determining that the two or more users are planning to access the conferencing software from the separate user devices located in the separate areas of the office premises is based on at least one of: a calendar of at least one of the two or more users, or a current or past geographic location of a user device of the at least one of the two or more users.

In Example 23, the subject matter of Examples 21-22 includes, receiving, in response to the prompt, indicia that at least two of the two or more users agree to participate in the conference using the shared device; and reserving the conference room for the at least two of the two or more users.

In Example 24, the subject matter of Examples 21-23 includes, receiving, in response to the prompt, indicia that only one of the two or more users agrees to participate in the conference using the shared device; and notifying a user device of the only one of the two or more users that the conference room is not being reserved due to lack of interest from other users.

In Example 25, the subject matter of Examples 21-24 includes, transmitting, to the shared device at a time of the conference, a control signal causing the shared device to automatically access the conference without additional human input.

In Example 26, the subject matter of Examples 21-25 includes, identifying a conference room configuration using an artificial intelligence engine and based on data associated with past conferences of at least a subset of the two or more users; and selecting the conference room based on the conference room configuration.

In Example 27, the subject matter of Examples 21-26 includes, identifying a change in plans of at least one user from the two or more users that causes the at least one user to be unable to participate in the conference using the shared device; and notifying other users from the two or more users of the change in plans.

Example 28 is a non-transitory computer readable medium storing instructions operable to cause one or more processors to perform operations comprising: determining, before a conference is implemented using conferencing software and based on stored data associated with two or more users associated with the conferencing software, that the two or more users are planning to access the conference from separate user devices located in separate areas of an office premises; determining, by accessing stored conference room scheduling data of the office premises, that a conference room within the office premises is available for use by the two or more users at a time of the conference; and transmitting, to each of the separate user devices, a prompt recommending that the two or more users participate in the conference using a shared device configured to access the conferencing software within the conference room.

In Example 29, the subject matter of Example 28 includes, wherein determining that the two or more users are planning to access the conferencing software from the separate user devices located in the separate areas of the office premises is based on a current or past geographic location of a user device of the at least one of the users.

In Example 30, the subject matter of Examples 28-29 includes, storing instructions operable to cause the one or more processors to perform operations comprising: receiving data indicating that at least two of the users agree to participate in the conference using the shared device; and reserving the conference room for the at least two of the users.

In Example 31, the subject matter of Examples 28-30 includes, storing instructions operable to cause the one or more processors to perform operations comprising: receiving data indicating that only one of the two or more users agrees to participate in the conference using the shared device; and notifying a user device of the only one of the two or more users that the conference room is not being reserved due to lack of interest from other users.

In Example 32, the subject matter of Examples 28-31 includes, storing instructions operable to cause the one or more processors to perform operations comprising: transmitting, to the shared device at a time of the conference, a control signal causing the shared device to access the conference responsive to an authentication of at least one user of the two or more users.

In Example 33, the subject matter of Examples 28-32 includes, storing instructions operable to cause the one or more processors to perform operations comprising: using an artificial intelligence engine to identify a conference room configuration based on data associated with past conferences of at least a subset of the users; and selecting the conference room based on the conference room configuration.

In Example 34, the subject matter of Examples 28-33 includes, storing instructions operable to cause the one or more processors to perform operations comprising: identifying a change in plans of at least one user from the two or more users that causes the at least one user to be unable to participate in the conference using the shared device; and notifying other users from the two or more users of the change in plans of the at least one user after receiving permission from the at least one user.

Example 35 is an apparatus, comprising: a memory; and a processor configured to execute instructions stored in the memory to: determining, before a conference is implemented using conferencing software and based on stored data associated with two or more users associated with the conferencing software, that the two or more users are planning to access the conference from separate user devices located in separate areas of an office premises; determining, by accessing stored conference room scheduling data of the office premises, that a conference room within the office premises is available for use by the two or more users at a time of the conference; and transmitting, to each of the separate user devices, a prompt recommending that the two or more users participate in the conference using a shared device configured to access the conferencing software within the conference room.

In Example 36, the subject matter of Example 35 includes, wherein determining that the two or more users are planning to access the conferencing software from the separate user devices located in the separate areas of the office premises is based on a current or past geographic location of a user device.

In Example 37, the subject matter of Examples 35-36 includes, the processor configured to execute instructions stored in the memory to: receive signals indicating that at least two of the users agree to participate in the conference using the shared device; and reserve the conference room for the at least two of the users by modifying a conference room data store.

In Example 38, the subject matter of Examples 35-37 includes, the processor configured to execute instructions stored in the memory to: receive data indicating that only one of the two or more users agrees to participate in the conference using the shared device; and transmit a notification indicating that the conference room is not being reserved due to lack of interest from other users.

In Example 39, the subject matter of Examples 35-38 includes, the processor configured to execute instructions stored in the memory to: transmit, to the shared device at a time of the conference, a control signal causing the shared device to access the conference.

In Example 40, the subject matter of Examples 35-39 includes, the processor configured to execute instructions stored in the memory to: select the conference room using a conference room configuration identified using artificial intelligence software and based on data associated with past conferences of one or more of the users.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining, by a conferencing server, during a video conference implemented using conferencing software and prior to selection of a conference room for the video conference, that two or more users are presently accessing the conferencing software from separate user devices located in separate areas within an audible distance of one another within an office premises by detecting, within an audio signal obtained from a first user device of the separate user devices by the conferencing server and output to ones of the separate user devices during the video conference, audio content captured, using a microphone of the first user device, from a speaker of a second user device of the separate user devices;
   determining, by accessing stored conference room scheduling data of the office premises using the conferencing server that communicates with the conferencing software and stores conference room scheduling data, that the conference room within the office premises is available for use by the two or more users;
   selecting, in response to determining that the two or more users are presently accessing the conferencing software from the separate user devices located in the separate areas within the audible distance of one another within the office premises, an available conference room based on stored conference configuration data associated with a user preference or a content of the video conference; and
   transmitting, to each of the separate user devices for display at each of the separate user devices within a part of a display unit associated with the video conference, a prompt recommending that the two or more users further participate in the video conference using a shared device configured to access the conferencing software within the conference room.

2. The method of claim 1, wherein determining that the two or more users are accessing the conferencing software from the separate user devices located in the separate areas of the office premises is based on at least one of: an occupied or reserved desk location of at least one of the separate user devices, a network switch, network router, or network port to which at least one of the separate user devices is connected, or a geographic location of at least one of the separate user devices.

3. The method of claim 1, comprising:
   receiving, in response to the prompt, indicia that at least two of the two or more users agree to further participate in the video conference using the shared device; and
   reserving the conference room for the at least two of the two or more users.

4. The method of claim 1, comprising:
   receiving, in response to the prompt, indicia that only one of the two or more users agrees to further participate in the video conference using the shared device; and
   notifying a user device of the only one of the two or more users that the conference room is not being reserved due to lack of interest from other users.

5. The method of claim 1, comprising:
   identifying, using an artificial intelligence engine including a neural network, a conference room configuration based on stored conference configuration data associated with at least one of the two or more users participating in the video conference, wherein the stored conference configuration data represents predicted use of conference room equipment by the at least one of the two or more users; and
   selecting the conference room having the conference room configuration.

6. The method of claim 1, comprising:
    identifying a conference room configuration based on stored conference configuration data associated with the video conference; and
    selecting the conference room based on the conference room configuration.

7. The method of claim 1, wherein the stored conference room scheduling data comprises a database storing a table, wherein the table indicates conference rooms in the office premises, times when the conference rooms are available or occupied, and features of the conference rooms.

8. The method of claim 5, wherein the conference room equipment comprises at least one of a whiteboard, soundproof walls, or a coffee machine.

9. A non-transitory computer readable medium storing instructions operable to cause one or more processors to perform operations comprising:
    determining, by a conferencing server, during a video conference implemented using conferencing software and prior to selection of a conference room for the video conference, that two or more users are presently accessing the conferencing software from separate user devices located in separate areas within an audible distance of one another within an office premises by detecting, within an audio signal obtained from a first user device of the separate user devices by the conferencing server and output to ones of the separate user devices during the video conference, audio content captured, using a microphone of the first user device, from a speaker of a second user device of the separate user devices;
    determining, by accessing stored conference room scheduling data of the office premises using the conferencing server that communicates with the conferencing software and stores conference room scheduling data, that the conference room within the office premises is available for use by the two or more users;
    selecting, in response to determining that the two or more users are presently accessing the conferencing software from the separate user devices located in the separate areas within the audible distance of one another within the office premises, an available conference room based on stored conference configuration data associated with a user preference or a content of the video conference; and
    transmitting, to each of the separate user devices for display at each of the separate user devices within a part of a display unit associated with the video conference, a prompt recommending that the two or more users further participate in the video conference using a shared device configured to access the conferencing software within the conference room.

10. The non-transitory computer-readable medium of claim 9, storing instructions operable to cause the one or more processors to perform operations comprising:
    transmitting, to the shared device, a control signal causing the shared device to automatically access the video conference without additional human input.

11. The non-transitory computer-readable medium of claim 9, wherein determining that the two or more users are accessing the conferencing software from the separate user devices located in the separate areas of the office premises is based on at least one of: an occupied desk location of at least one of the separate user devices, a network device to which the at least one of the separate user devices is connected, or a geographic location of at least one of the separate user devices.

12. The non-transitory computer-readable medium of claim 9, storing instructions operable to cause the one or more processors to perform operations comprising:
    receiving, in response to the prompt, information indicating that at least two of the two or more users agree to further participate in the video conference using the shared device; and
    reserving the conference room for the at least two of the two or more users in response to the received information.

13. The non-transitory computer-readable medium of claim 9, storing instructions operable to cause the one or more processors to perform operations comprising:
    receiving, in response to the prompt, information indicating that only one of the two or more users agrees to further participate in the video conference using the shared device; and
    notifying, in response to the received information, a user device of the only one of the two or more users that the conference room is not being reserved due to lack of interest from other users.

14. The non-transitory computer-readable medium of claim 9, storing instructions operable to cause the one or more processors to perform operations comprising:
    identifying, using an artificial intelligence engine including a neural network, conference configuration data associated with at least one of the two or more users participating in the video conference, wherein the conference configuration data represents predicted use of conference room equipment by the at least one of the two or more users; and
    selecting the conference room based on the stored conference configuration data.

15. The non-transitory computer-readable medium of claim 9, storing instructions operable to cause the one or more processors to perform operations comprising:
    identifying a conference room configuration based on configuration data associated with the video conference; and
    selecting the conference room based on the conference room configuration.

16. An apparatus, comprising:
    a memory; and
    a processor configured to execute instructions stored in the memory to:
        determine, by a conferencing server, during a video conference implemented using conferencing software and prior to selection of a conference room for the video conference, that two or more users are presently accessing the conferencing software from separate user devices located in separate areas within an audible distance of one another within an office premises by detecting, within an audio signal obtained from a first user device of the separate user devices by the conferencing server and output to ones of the separate user devices during the video conference, audio content captured, using a microphone of the first user device, from a speaker of a second user device of the separate user devices;
        determine, by accessing stored conference room scheduling data of the office premises using the conferencing server that communicates with the conferencing software and stores conference room scheduling data, that the conference room within the office premises is available for use by the two or more users;

select, in response to determining that the two or more users are presently accessing the conferencing software from the separate user devices located in the separate areas within the audible distance of one another within the office premises, an available conference room based on stored conference configuration data associated with a user preference or a content of the video conference; and transmit, to each of the separate user devices for display at each of the separate user devices within a part of a display unit associated with the video conference, a prompt recommending that the two or more users further participate in the video conference using a shared device configured to access the conferencing software within the conference room.

17. The apparatus of claim 16, wherein determining that the two or more users are accessing the conferencing software from the separate user devices located in the separate areas of the office premises is based on at least one of: a reserved desk location of at least one of the separate user devices, a network identifier of a wireless network to which the at least one of the separate user devices is connected, or a geographic location of the at least one of the separate user devices.

18. The apparatus of claim 16, wherein the processor is configured to execute the instructions stored in the memory to:

receive a signal that at least one user agrees to further participate in the video conference using the shared device; and reserve the conference room for the at least one user.

19. The apparatus of claim 16, wherein the processor is configured to execute the instructions stored in the memory to:

receive, in response to the prompt, indicia that exactly a single user agrees to further participate in the video conference using the shared device; and notify a user device of the single user that the conference room is not being reserved due to lack of interest from other users.

20. The apparatus of claim 16, wherein the processor is configured to execute the instructions stored in the memory to:

identify, using an artificial intelligence engine including a neural network, a conference room configuration based on stored conference configuration data associated with at least one of the two or more users participating in the video conference, wherein the stored conference configuration data represents predicted use of conference room equipment by the at least one of the two or more users; and select the conference room having the conference room configuration.

* * * * *